US006944580B1

(12) United States Patent
Blume et al.

(10) Patent No.: US 6,944,580 B1
(45) Date of Patent: Sep. 13, 2005

(54) METHOD AND SYSTEM FOR DESIGNING FRAMES AND CASES

(75) Inventors: Karl Blume, Hebron, CT (US); Dennis L. Mackey, Stuart, FL (US); Amy U. Serwinowski, Jupiter, FL (US); David W. Leung, Hollywood, FL (US); Charlie Quackenbush, Tyler, TX (US); Jeffrey Simpson, Palm Beach Gardens, FL (US); Duncan C. Meyers, Bolton, CT (US); Frank Shurick, Vernon, CT (US); Henry Huizinga, Palm Beach Gardens, FL (US); Robert Rozelle, Farmington Hills, MI (US); Gregory E. Chetta, Palm Beach Gardens, FL (US); Jonathan Schmid, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 815 days.

(21) Appl. No.: 09/608,620

(22) Filed: Jun. 30, 2000

(51) Int. Cl.[7] ............................................. G06F 17/50
(52) U.S. Cl. ............................. 703/1; 700/96; 700/97; 700/98; 700/103; 700/104; 700/117; 703/6; 703/8; 706/45
(58) Field of Search .................... 703/1, 6, 8; 700/104, 700/103, 96–98, 117; 706/45

(56) References Cited

U.S. PATENT DOCUMENTS

| 4,841,726 | A | * | 6/1989 | Burkhardt | 60/226.1 |
| 5,219,268 | A | * | 6/1993 | Johnson | 415/115 |
| 5,297,054 | A | * | 3/1994 | Kienzle et al. | 364/474 |
| 5,799,293 | A | * | 8/1998 | Kaepp | 706/45 |
| 6,173,566 | B1 | * | 1/2001 | Boeck | 60/226.1 |
| 6,230,066 | B1 | * | 5/2001 | Sferro et al. | 700/104 |
| 6,341,261 | B1 | * | 1/2002 | Vasey-Glandon et al. | 703/6 |
| 6,393,331 | B1 | * | 5/2002 | Chetta et al. | 700/97 |
| 6,587,741 | B1 | * | 7/2003 | Chetta et al. | 700/97 |
| 6,625,507 | B1 | * | 9/2003 | Dickerson et al. | 700/97 |
| 2003/0034995 | A1 | * | 2/2003 | Osborn et al. | 345/713 |
| 2003/0123974 | A1 | * | 7/2003 | Czachor | 415/116 |

OTHER PUBLICATIONS

J. Takala, M. Kuulusa, P. Ojala & J. Nurmi, "Enhanced DSP Core for Embedded Applications", Oct. 1999. 1999 IEEE Workshop on SiGNAL Processing Systems (SiPS'99).*

* cited by examiner

*Primary Examiner*—Thai Phan
*Assistant Examiner*—Herng-der Day
(74) *Attorney, Agent, or Firm*—McCormick Paulding & Huber LLP

(57) ABSTRACT

A method for designing an engine case static structure of a gas turbine engine includes creating signals representing an engine case static structure knowledge base of information. The knowledge base has a plurality of design rule signals with respect to a corresponding plurality of parameter signals of associated elements of an engine case static structure, wherein the knowledge base comprises at least one data value signal for each of the plurality of design rule signals. A desired data value signal is entered for a selected one of the plurality of parameter signals of an associated element of the engine case static structure and compared to the corresponding data value signal in the knowledge base for the corresponding one of the plurality of design rule signals. Signals representative of a geometric representation of the selected parameter signal may be created.

26 Claims, 12 Drawing Sheets

Weight Report for ENGINE CASES

| OK | EXAMINE CONTRIBUTOR | — 54
— 46

Component

30 — ENGINE CASES    Weight =

Contributors

| | | |
|---|---|---|
| 100 — FAN | Weight | = |
| FAN EXIT CASE | Weight | = |
| 102 — LPC | Weight | = |
| 104 — INTERMEDIATE CASE | Weight | = |
| 124 — HPC | Weight | = |
| 126 — DIFFUSER | Weight | = |
| 110 — HPT | Weight | = |
| 106 — LPT | Weight | = |
| 108 — TURBINE EXHAUSE CASE | Weight | = |
| SPLITTER | Weight | = |
| TORQUE BOX | Weight | = |
| 125 — WISHBONE | Weight | = |

FIG. 9

Weight Report for HPC

[OK] [EXAMINE CONTRIBUTOR]

Component

HPC   Weight =

Contributors

- [ ] HPC RING CASE ASSEMBLY   Weight =
- [ ] HPC SEGMENT 1   Weight =
- [ ] HPC SEGMENT 2   Weight =

Weight Report for HPC RING CASE ASSEMBLY

[OK] [EXAMINE CONTRIBUTOR] ← 46  ← 54

Component
HPC RING CASE ASSEMBLY    Weight =

Contributors
☐ HPC SPACER CASE 1    Weight =
☐ HPC SPACER CASE 2    Weight =
☐ HPC SPACER CASE 3    Weight =
☐ HPC OUTER AIR SEAL 1    Weight =
☐ HPC OUTER AIR SEAL 2    Weight =
☐ HPC OUTER AIR SEAL 3    Weight =
☐ HPC OUTER AIR SEAL 4    Weight =

METHOD AND SYSTEM FOR DESIGNING FRAMES AND CASES

CROSS REFERENCE TO RELATED APPLICATIONS

The subject matter disclosed herein is related to the subject matter of commonly owned U.S. patent applications: U.S. patent application Ser. No. 09/212,922, filed on Dec. 16, 1998, entitled "Method of Designing a Turbine Blade Outer Air Seal" and issued on May 21, 2002 as U.S. Pat. No. 6,393,331; U.S. patent application Ser. No. 09/520,085, filed on Mar. 7, 2000 entitled "Method and System for Designing a Spline Coupling" and issued on Jul. 1, 2003 as U.S. Pat. No. 6,587,741; U.S. patent application Ser. No. 09/511,549 filed on Feb. 23, 2000, entitled "Method and System for Designing a Low Pressure Turbine Shaft" and issued Sep. 23, 2003 as U.S. Pat. No. 6,625,507; and pending U.S. patent application Ser. No. 09/517,567 filed on Mar. 2, 2000, entitled "Method and System for Designing an Impingement Film Floatwall Panel System". All of the foregoing patent applications are hereby incorporated by reference.

FIELD OF THE INVENTION

This invention relates generally to computer-based methods of designing products, and more particularly to a computer-based method of designing an engine case static structure including frames and cases for a gas turbine engine.

BACKGROUND OF THE INVENTION

A gas turbine engine consists of stationary and rotating components. The rotating components include compressor blades and turbine blades mounted on disks which are interconnected by rotors and shafts. The stationary components are the engine case assembly static structure, and include frames and cases. The frames and cases provide structural support for the rotors and shafts and create a passageway that constrains the flow of air and combustion gases, or flowpath, through the engine. The engine case static structure also includes bearings which are used to connect the rotating components to the stationary frames. Frames include an inner wall, struts, and an outer wall. The struts cross the flowpath, enabling support loads to be transferred from interior rotor support bearings to the outer case walls. Cases include an outer wall but do not have an inner wall or struts.

An engine case static structure designer begins with a flowpath which is an aerodynamic engine definition provided by the flowpath designers, and performance data which is a thermodynamic engine definition. The engine case static structure designer must then lay out an engine case static structure configuration, including bearing locations, case boundary locations, strut locations, flange locations, wall thickness, mounts, manifolds and standard parts. This process is referred to as the conceptual design and can take approximately one month to complete. The purpose of the conceptual design is to evaluate several candidate flowpaths and select the best overall design configuration. Due to fixed time constraints and the one month conceptual design period for each design, an engine case designer is limited in the number of flowpaths that can be evaluated before it becomes necessary to select the "best" configuration and proceed into the preliminary and final design phases.

A shorter design period for creating an engine case static structure would allow more time for gas turbine engine system level analysis and concept trade studies focusing on weight of the gas turbine engine. The shorter period would also permit the gas turbine engine designers to generate additional design cycles for evaluation of alternative flowpaths and engine designs, and evaluation of the design for performing maintenance, thereby generating more efficient engine case static structures. In addition, the engine case static structure design should incorporate vibration analysis and finite element structural analysis of blade loss design requirements and backbone bending assessment.

The engine case static structure is the foundation of the gas turbine engine. A shorter design cycle which includes a more thorough evaluation and analyses of the engine case static structure, including the cases and the frames, during the conceptual design phase improves the selection of the best overall configuration, thereby reducing the risk of major redesigns during the preliminary and final design. Since the design of an engine case static structure must be an efficient integration of all components with no wasted space, any configuration changes have a domino effect, which is time consuming to implement and can have serious consequences to manufacturing schedules and cost orders for items requiring a long lead time, such as raw material, tooling, castings and forgings.

It is known to design various products using a computer-aided design ("CAD") system, a computer-aided manufacturing ("CAM") system, and/or a computer-aided engineering ("CAE") system. For sake of convenience, each of these similar types of systems is referred to hereinafter as a CAD system. A CAD system is a computer-based product design system implemented in software executing on a workstation. A CAD system allows the user to develop a product design or definition through development of a corresponding product model. The model is then typically used throughout the product development and manufacturing process. An example is the popular Unigraphics system commercially available from Unigraphics Solutions, Inc. (hereinafter "Unigraphics").

In addition to CAD systems, there is another type of computer-based product design system which is known as a "Knowledge-Based Engineering" ("KBE") system. A KBE system is a software tool that enables an organization to develop product model software, typically object-oriented, that can automate engineering definitions of products. The KBE system product model requires a set of engineering rules related to design and manufacturing, a thorough description of all relevant possible product configurations, and a product definition consisting of geometric and non-geometric parameters which unambiguously define a product. An example is the popular ICAD system commercially available from Knowledge Technologies, Inc. KBE systems are a complement to, rather than a replacement for, CAD systems.

An ICAD-developed program is object-oriented in the sense that the overall product model is decomposed into its constituent components or features whose parameters are individually defined. The ICAD-developed programs harness the knowledge base of an organization's resident experts in the form of design and manufacturing rules and best practices relating to the product to be designed. An ICAD product model software program facilitates rapid automated engineering product design, thereby allowing high quality products to get to market quicker.

The ICAD system allows the software engineer to develop product model software programs that create parametric, three-dimensional, geometric models of products to be manufactured. The software engineer utilizes a proprietary ICAD object-oriented programming language, which is based on the industry standard LISP language, to develop a product model software program that designs and manipulates desired geometric features of the product model. The product model software program enables the capturing of the engineering expertise of each product development discipline throughout the entire product design process. Included are not only the product geometry but also the product non-geometry, which includes product configuration, development processes, standard engineering methods and manufacturing rules. The resulting model configuration and parameter data, which typically satisfy the model design requirements, comprise the output of the product model software program. This output, from which the actual product may be manufactured, comprises a file containing data (e.g., dimensions) defining the various parameters and configuration features associated with each component or element of the product.

Also, the product model software program typically performs a "what if" analysis on the model by allowing the user to change model configuration and/or physical parameter values and then assess the resulting product design. Other analyses may be run to assess various model features with regard to such functional characteristics as performance, durability and manufacturability. The analytical results, e.g. temperature and stress, are functional parameters that are evaluated in terms of boundaries or limits. Limits on both physical and functional parameters have been developed over time based on knowledge accumulated through past design, manufacturing, performance, and durability experience. Essentially, these parameter limits comprise rules against which the proposed product model design is measured. Use of these historically developed parameters, analyses, and design procedures in this way is typically referred to as product "rule-based design" or "knowledge-based design". The rules determine whether the resulting product design will satisfy the component design requirements, such as weight, and whether the design is manufacturable, given various modern manufacturing processes. The rules for a particular product design are pre-programmed into the product model software program for that specific product.

While the ICAD system provides an excellent tool for developing software product models, it is not a replacement for an organization's primary CAD system, which maintains the product model definition throughout the entire product design and manufacturing cycle. This is because the ICAD system is a KBE software development tool rather than a CAD system. For example, while the ICAD system can create a geometric model, it cannot easily create drawings based on that model or support other aspects of the design process typically provided by CAD systems. As such, for the product model created in the ICAD system to be useful throughout the entire product development process, the model must be transported into a CAD system for further manipulation.

Another inherent problem with the commercial ICAD system is that the parametric model created by the product model software program cannot be transported as a similar parametric product model into a Unigraphics CAD system. Instead, the parametric model in ICAD must be transported into Unigraphics as a non-parametric model.

Since design and manufacturing technology is always evolving, the product model imported from the ICAD system into Unigraphics will usually be enhanced with new technology design or manufacturing features. Furthermore, since it is difficult to make modifications to a non-parametric model in Unigraphics, revisions to the product model must normally be made in the ICAD system and re-imported into Unigraphics. This causes any additional features previously added in Unigraphics to be lost.

On the other hand, the Unigraphics CAD system has inherent problems in that not all of the parametric models created by Unigraphics are "standardized" within an organization or industry. Also, parametric models implemented in Unigraphics do not effectively implement a KBE system (similar to the ICAD system) that requires the model configuration and order of Boolean operations to vary according to design requirements. Also, a Unigraphics parametric model cannot be structured to provide parameter relationships that satisfy both design and manufacturing requirements.

As a result, there are instances when a product model developed solely in either the ICAD system or the Unigraphics system will suffice, even with the aforementioned shortcomings. However, there are other instances when it is desired to transport a parametric product model developed in the ICAD system to the Unigraphics CAD system as a corresponding parametric product model.

An object of the present invention is to provide a computer-based method of creating a parametric, two and three-dimensional, geometric product model of the engine case static structure of a gas turbine engine.

Another object of the present invention is to reduce the design period for creating the engine case static structure of a gas turbine engine.

Another object of the present invention is to provide a computer-based method of creating a parametric product model in a KBE system that can be recreated as a similar parametric product model in a CAD system.

The above and other objects and advantages of the present invention will become more readily apparent when the following description of a best mode embodiment of the present invention is read in conjunction with the accompanying drawings.

SUMMARY OF THE INVENTION

A method of designing an engine case static structure of a gas turbine engine including the step of creating signals representing an engine case static structure knowledge base of information. The engine case static structure knowledge base has a plurality of design rule signals with respect to a corresponding plurality of parameter signals of associated elements of an engine case static structure, wherein the engine case static structure knowledge base comprises at least one data value signal for each one of the plurality of design rule signals. The steps also include entering a desired data value signal for a selected one of the plurality of parameter signals of an associated element of the engine case static structure, and comparing the entered desired data value signal for the selected one of the plurality of parameter signals with the corresponding at least one data value signal in the engine case static structure knowledge base for the corresponding one of the plurality of design rule signals. Also included is the step of creating signals representative of a geometric representation of the selected one of the plurality of parameter signals of the associated element of the engine case static structure if the result of the step of comparing is such that the entered desired data value signal for the selected one of the plurality of parameter signals is determined to have a first predetermined relationship with respect to the corresponding at least one data value signal in the engine case static structure knowledge base for the selected one of the plurality of design rule signals.

A computerized system for designing an engine case static structure of a gas turbine engine includes an engine case static structure knowledge base which includes a plurality of design rule signals for generating signals representing an engine case static structure model, wherein each of the design rule signals has a first relationship with at least one of a plurality of design parameter signals. Also included are input means for receiving a design parameter value signal corresponding to one of the plurality of design parameter signals, and evaluation means for comparing the design parameter value signal with the plurality of design rule signals. The system also includes adjustment means for modifying the engine case static structure model signals utilizing the design parameter value signal and the plurality of design rule signals, and creation means for generating signals representative of a geometric representation of the engine case static structure model signals.

BRIEF DESCRIPTION OF THE DRAWINGS

FIG. 4 which includes

FIG. 9 is an exemplary graphical user interface displayed to the user of the product model software program of FIG. 4 illustrating a weight analysis report;

DETAILED DESCRIPTION OF THE PREFERRED EMBODIMENT

Referring to the figures in general, in an exemplary embodiment of the present invention, the invention generally comprises a method and system embodied in a knowledge-based, product model software program 10 that creates a model 20 of an engine case static structure 30 of a gas turbine engine (not shown). The resulting product may then be manufactured from the engine case static structure model 20. The product model software program 10 may preferably be embodied in the aforementioned ICAD system, commercially available from Knowledge Technologies, Inc., and operating within a work station, such as that available from Sun Microsystems or Silicon Graphics. The method and system of the present invention enables the rapid creation, shaping, sizing and manipulation of a parametric, three-dimensional, geometric model 20 of the engine case static structure 30. A design cycle for the engine case static structure 30 may be completed in as little as one day. The method and system of the present invention reduces both the number of designers needed for designing an engine case static structure and also makes the design of engine case static structure an engineering problem, rather than an art.

Figure 1:
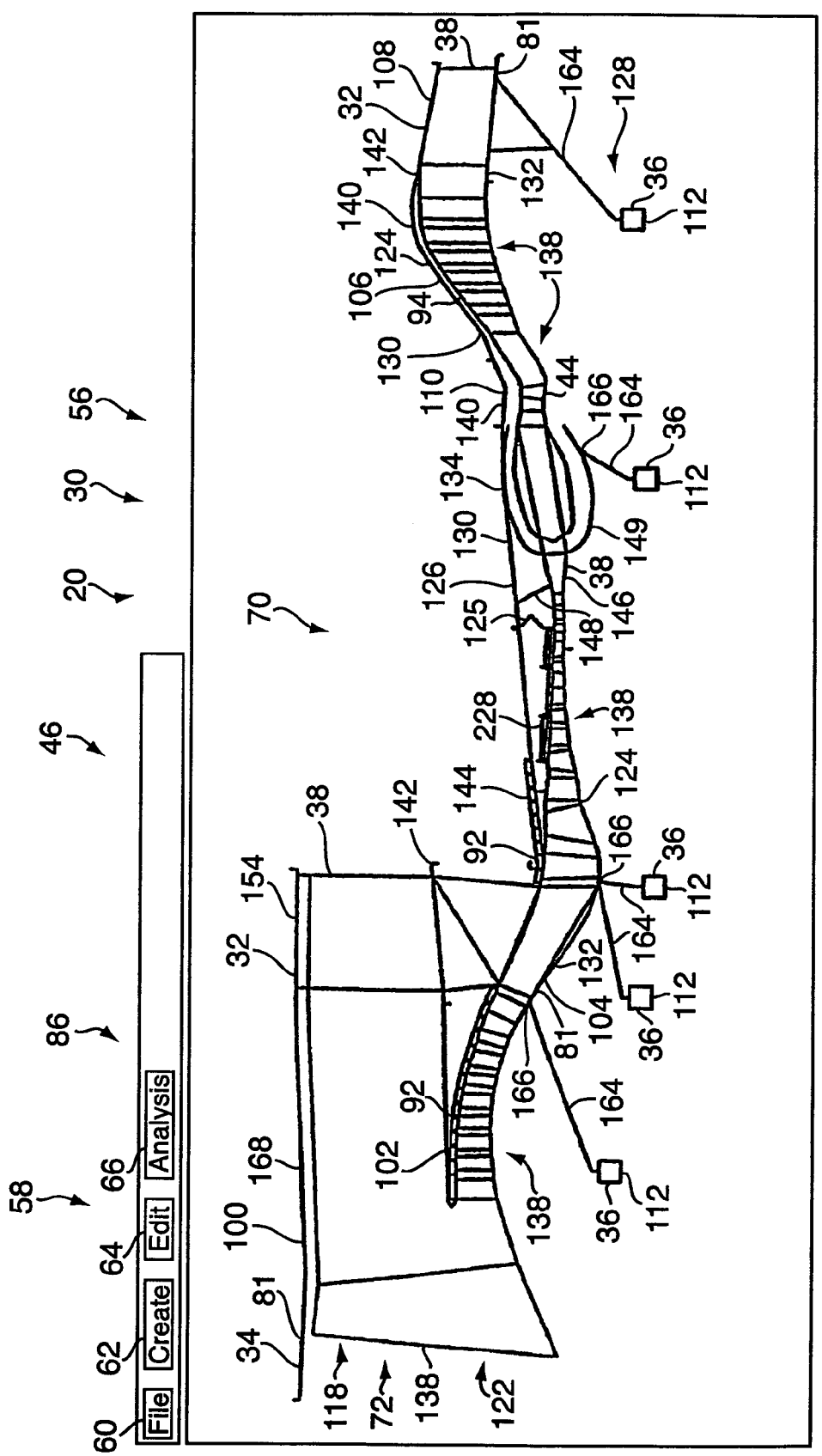
FIG. 1 is an illustration of an exemplary graphical user interface displayed to the user of the product model software program showing a stick figure representation of an engine case static structure and a flowpath for a gas turbine engine, the representation being created by the product model software program of FIG. 4 in accordance with the method and system of the present invention.

Referring to FIG. 1, the designer of the engine case static structure model 20 of the engine case static structure 30 obtains performance and flowpath specifications from the flowpath designers. Once this information is entered, the product model software program 10 uses its internal engine case static structure knowledge base of configuration dependent parameter relationships and constraints to create a valid model 20 of the engine case static structure 30. The configuration dependent parameters become the default parameters for the engine case static structure model 20. The product model software program 10 displays the default parameters, and allows modifications to the parameters and the resulting engine case static structure model 20. The configuration default parameters include quantity, position, and dimensions of frames 32, cases 34 and bearing locations 36, as well as struts 38.

One of the goals embodied in the rules of the product model software program 10 is to create the lightest engine case static structure 30 which meets overall performance and configuration requirements. Minimizing the cost of the engine case static structure is one of the overall requirements, in addition to satisfying stress and temperature requirements. The product model software program 10 allows the user to quickly create different variations of the engine case static structure model 20 to assess the benefits and advantages of one variation of a model compared to the benefits and advantages of another model by comparing the criteria of weight, material cost, and manufacturing costs for each model.

It should be understood that engine case static structure parameters, and their order of entry into the product model software program 10, are purely exemplary. Instead, as should be readily apparent to one of ordinary skill in the art, engine case static structure components and characteristics may have their dimensions input in various orders by the user.

During product model software program 10 operation, the user enters or modifies parameters, including configuration data, regarding various structural features of the engine case static structure 30. This information is typically entered using a keyboard 40 or a mouse 42 associated with a work station 44. The user is guided by graphical user interfaces ("GUIs") 46 containing information provided on a visual display screen 48 associated with the work station 44. The product model software program 10 compares the input design information against a engine case static structure knowledge base 50 of information stored as part of the product model software program. This determines whether any design constraints have been violated which would cause the engine case static structure model 20 to not satisfy the design requirements or be non-producible using modem manufacturing techniques. If so, the engine case static structure model 20 is invalid.

The stored information comprises a pre-programmed engine case static structure knowledge base 50 of a plurality of configuration dependent parameter relationships and design rules regarding acceptable durability, manufacturing and performance design limits for the engine case static structure 30. The displayed engine case static structure model 20 may then be manipulated by changing various parameters or attributes associated with corresponding components 52, or associated elements 52, of the engine case static structure 30. One of the advantages of the product model software program 10 is that it aids a designer who is familiar with design constraints of a engine case static structure 30, but who may not be familiar with manufacturing constraints or preferences of a particular company. The designer would have to spend a substantial amount of time looking up and learning a company's manufacturing constraints and preferences, or risk creating a design which could not be built or would be too expensive or difficult to build. The product model software program 10 eliminates this time-consuming and expensive problem by including the manufacturing constraints and company preferences as part of the engine case static structure knowledge base 50.

The product model software program 10 also performs a weight report analysis 54 on the engine case static structure model 20. When the configuration parameters of the engine case static structure model 20 are complete, the product model software program 10 outputs files containing model parameters, including configuration parameter values. Other computer programs may then use these output files in a desired manner, such as for further analysis of the engine case static structure model 30. The product model software program 10 also creates a non-parametric geometric model for use in a CAD system. The main output of the program model software program 10 consists of two-dimensional and three-dimension Unigraphics part files of engine case static structure model 20 components 52, the weight report 54, a finite element analysis model input file, and a vibration and deflection analysis input file.

As shown in the main GUI screen 56 in FIG. 1, the buttons 58 labeled File 60, Create 62, Edit 64, and Analysis 66, roughly indicate the usual logical steps in the design process for developing the engine case static structure model 20. Each of the buttons 58 accesses a drop-down menu which invokes at least one additional GUI screen 46 for adding or modifying engine case static structure model 20 parameters, such as the bearing locations 36. While a logical order to the design process for the engine case static structure model 20 has been shown, the present invention is not limited in this regard, as product model software program 10 parameters may be modified and input in numerous different orders.

FIG. 1 illustrates the main graphical user interface (GUI) 56 of the present invention and displays a simplified stick figure representation 70 of engine case static structure 30 and a simplified diagram of a flowpath 72. The flowpath parameters are coded according to the primary components 52 that make up a gas turbine engine. The components 52 may vary depending upon the type of flowpath 72, i.e. high or low bypass design. The flowpath 72 shown is an example of a high bypass design, such as for a commercial passenger airline application. A low bypass flowpath (not shown) is typical of military applications. Each component 52 of the engine case static structure model 20 contains a number of distinct physical structural features or forms that may be designed by the product model software program 10, in accordance with an exemplary embodiment of the present invention. Many types of known structural features of the engine case static structure 30 are contemplated by the method and system of the present invention, as described hereinafter.

Figure 3:
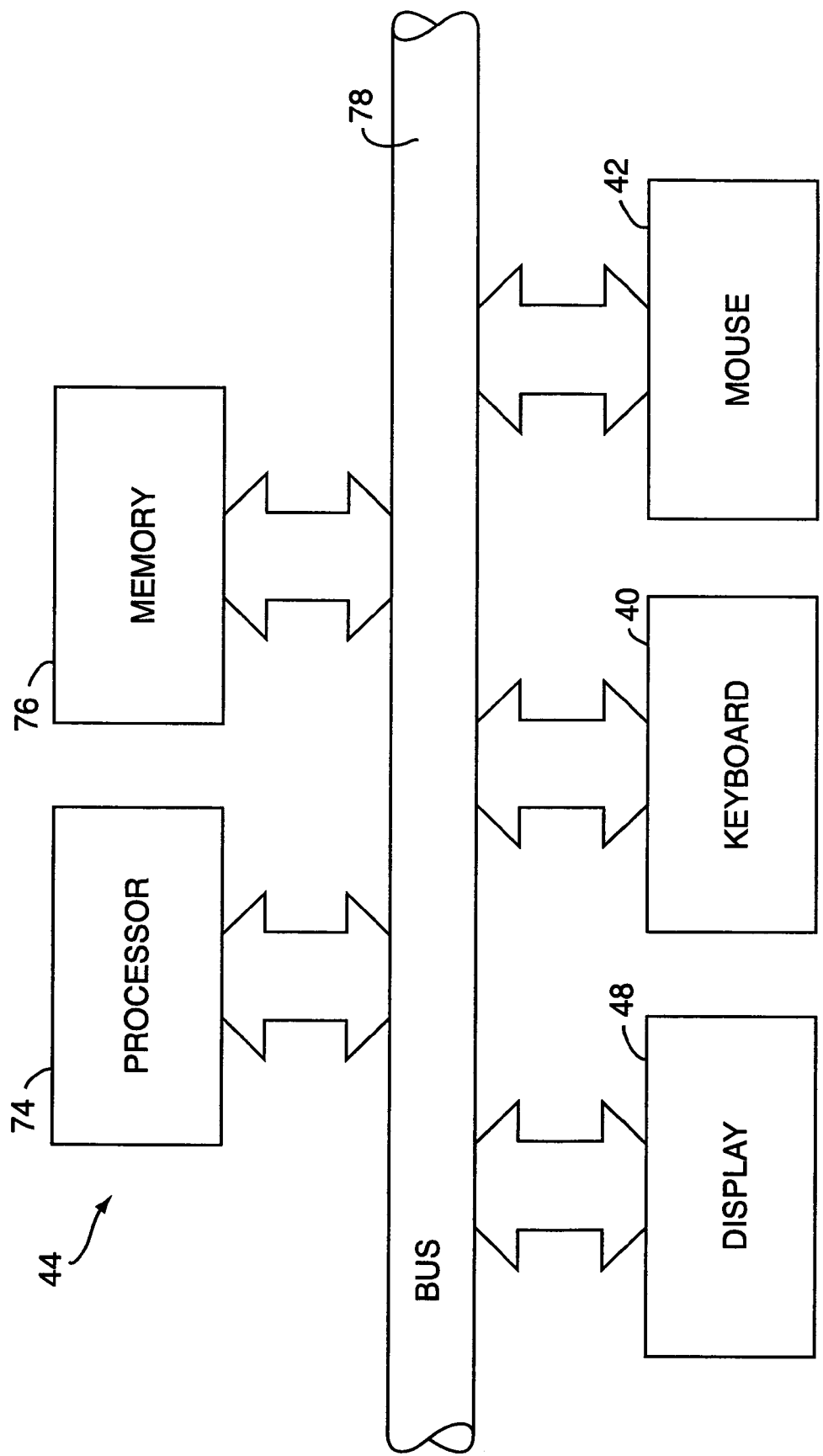
FIG. 3 is a block diagram of a work station within which the product model software program of FIG. 4 is implemented.

FIG. 3 illustrates the work station 44 which executes the program code of the product model software program 10 for creating the engine case static structure 30. The program code is preferably written in the proprietary ICAD object-oriented programming language, which is based on the industry standard LISP language. The program code executes on a computer processor 74 within the work station 44. The work station 44 may also contain a memory 76 for storing the program code and calculated data, the visual display screen 48 for displaying various information to the user along with the engine case static structure model 20 after it has been created, and the keyboard 40 and the mouse 42 that are both used to input information to the processor 74 and the memory 76. These various devices are connected together by a bus 78.

The product model software program 10 consists of signals stored on a computer system 44, such as the work station 44, which are processed by the processor 74, of the work station. The engine case static structure knowledge base 50 included within the product model software program 10 also consists of signals stored on the computer system 44, as are the specifications and parameters stored within the knowledge base, and the geometric representations and the engine case static structure model 20 created by the product model software program. Some signals are displayed to the user, such as signals representing parameters or geometric representations of the engine case static structure 30. Parameters are a variable or an arbitrary constant appearing in a mathematical expression or a computer program, each value of which restricts or determines the specific form of the expression. A parameter is broader and more general than a specification. A specification is an entry or variable prescribing materials, dimensions, and workmanship for something to be built, installed or manufactured. Specifications are a subset of parameters.

Figure 6:
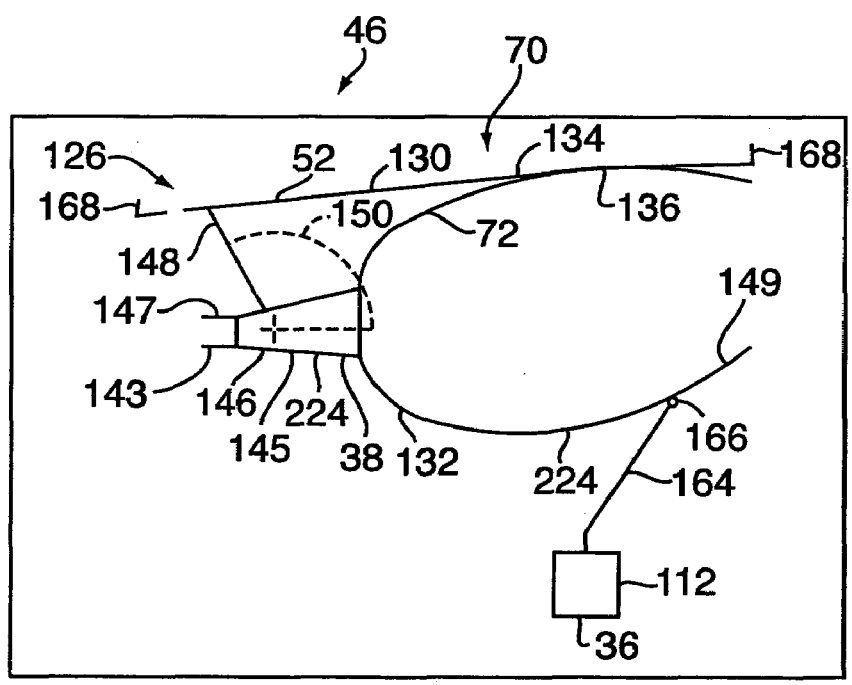
FIG. 6 is an illustration of a diffuser frame component of the engine case static structure model and flowpath created by the product model software program of FIG. 4.
Figure 6A:
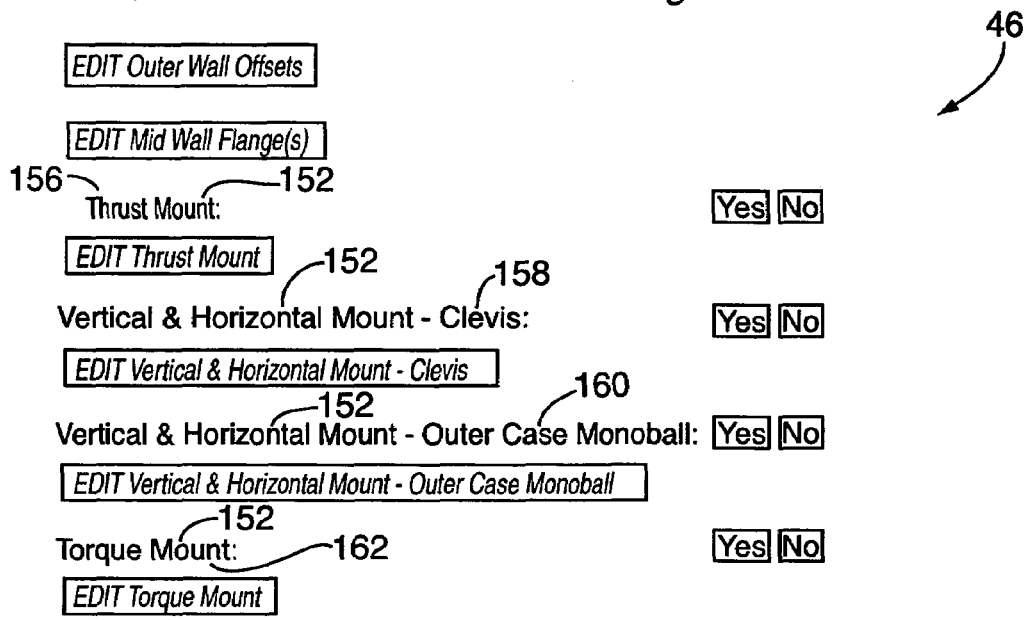
FIG. 6A is an exemplary graphical user interface displayed to the user of the product model software program of FIG. 4 illustrating types of selectable mounts.
Figure 6B:
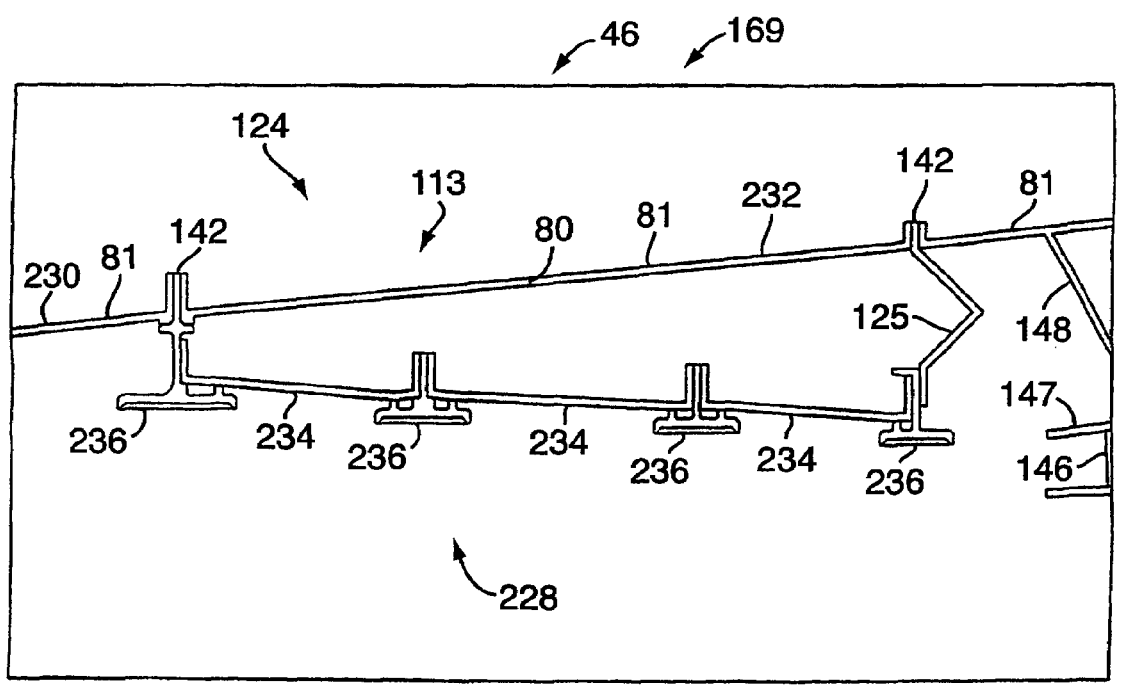
FIG. 6B is an illustration of a high pressure compressor component of the engine case static structure model created by the product model software program of FIG. 4.

A design rule is a relationship between parameters or parameter values, including specifications, such as minimizing the wall thickness 80 of a frame 32 or a case 34, as shown in FIG. 6B, while designing a wall 81 strong enough to satisfy a pressure data value from performance file flight point data. Parameter values may be predefined in the engine case static structure knowledge base 50 or entered by a user.

Figure 4A:
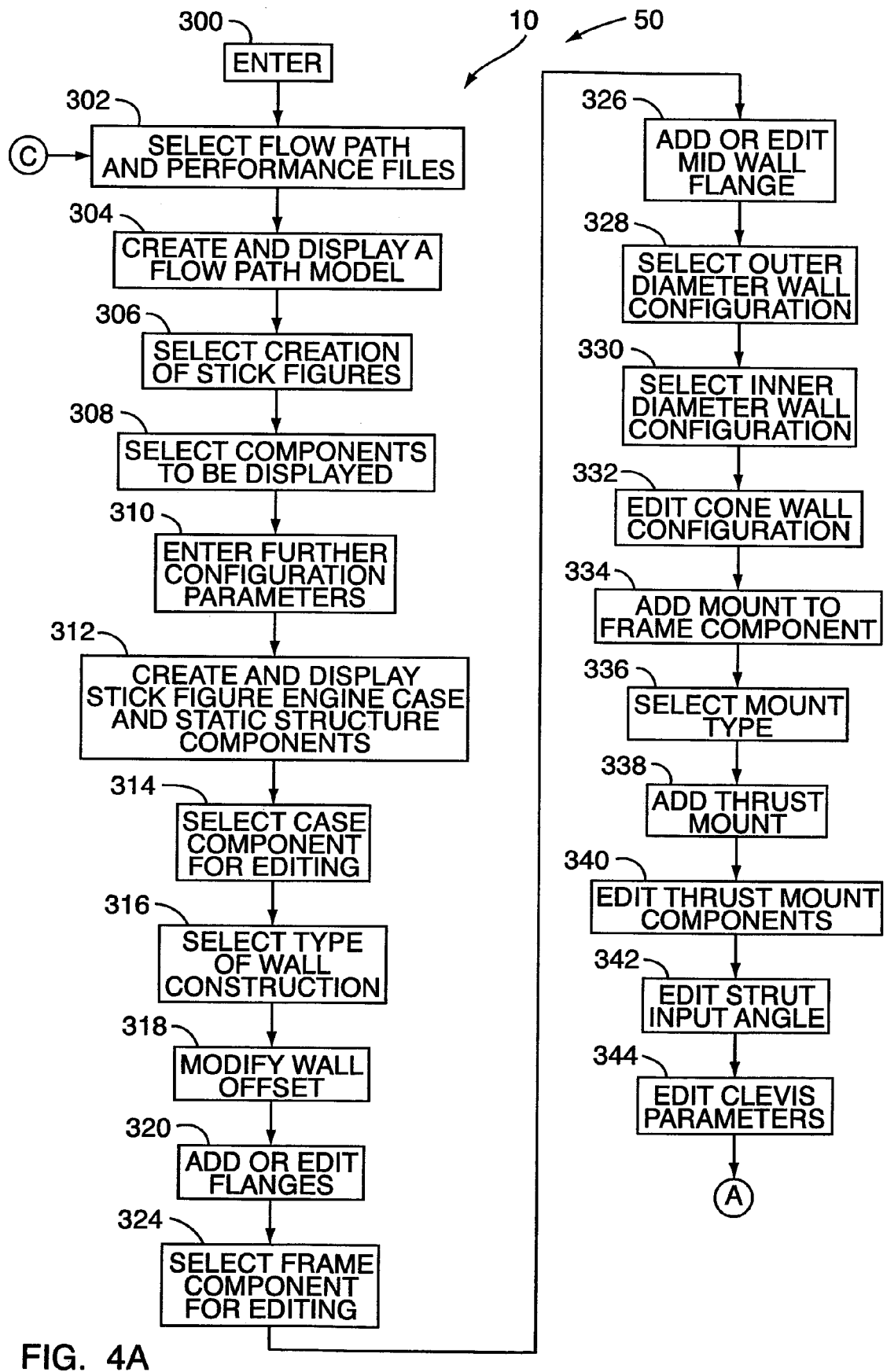
FIGS. 4A–4C, illustrates a flow chart showing an embodiment of steps performed by the product model software program in creating the geometric models of FIGS. 1, 2 and 5–11 in accordance with the method and system of the present invention.
Figure 4B:
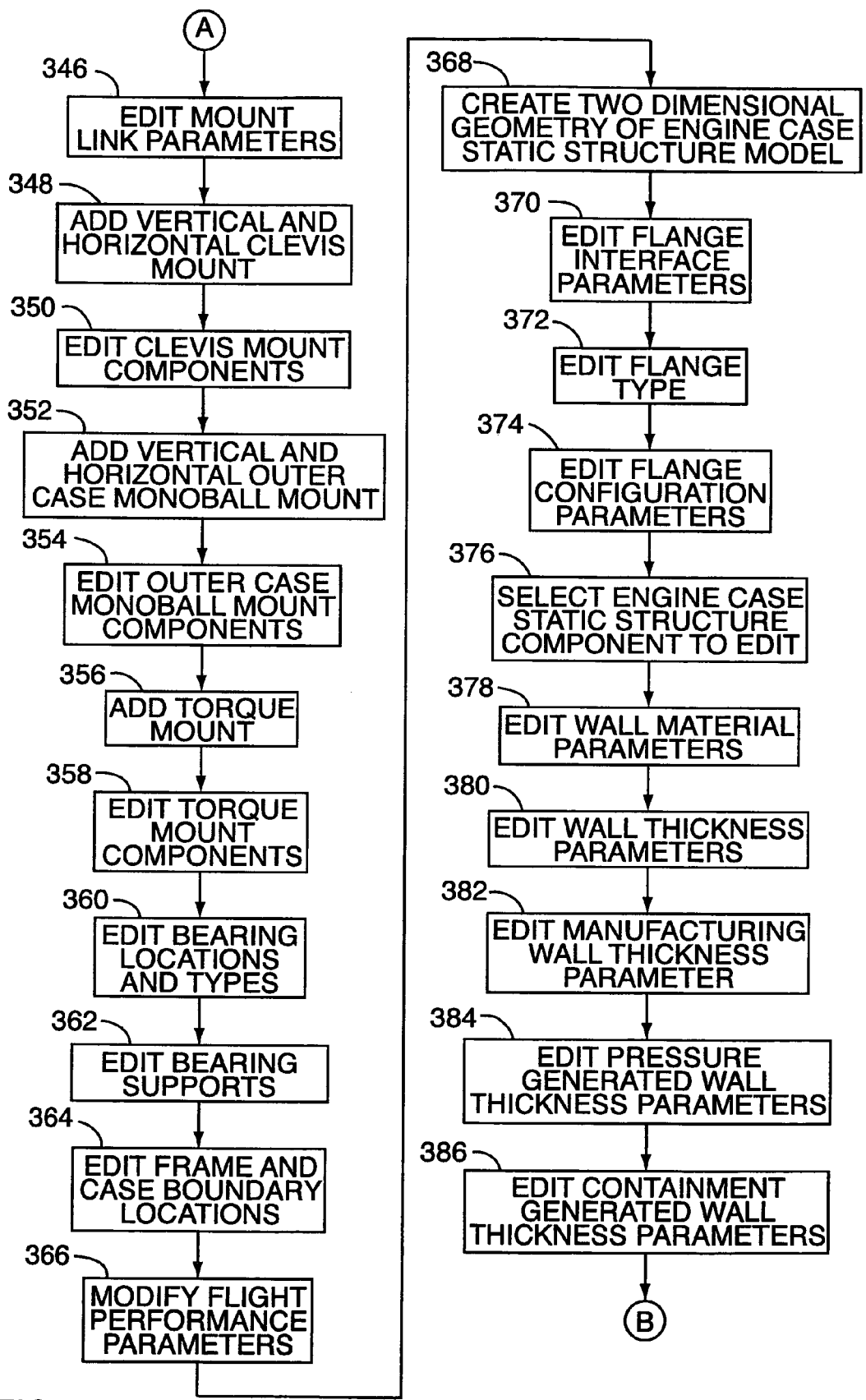
Figure 4C:
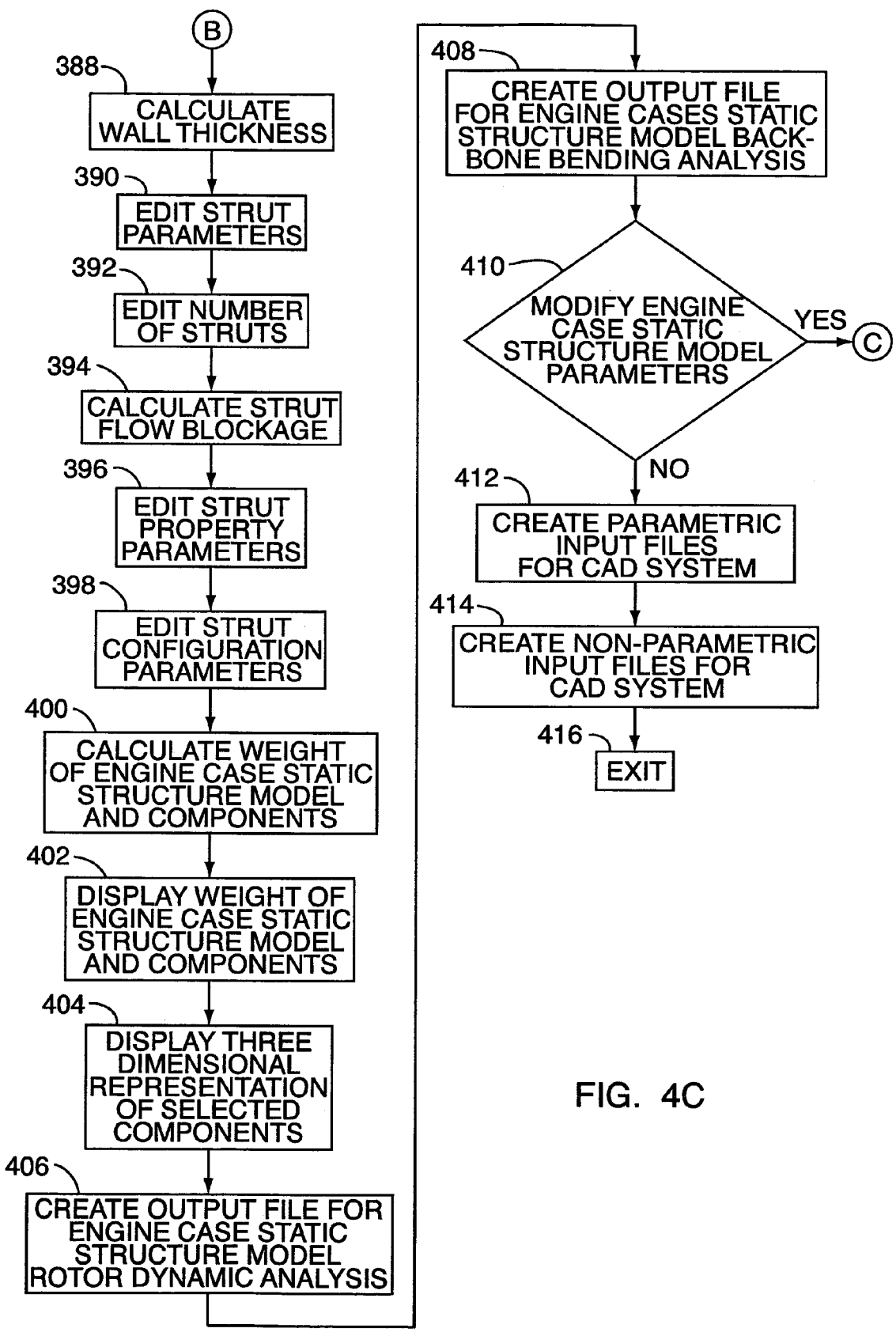

Referring to FIGS. 1 and 4 and the step 300, the user selects the File button 60 from a main menu 86 displayed on the main GUI screen 56, and the product model software program 10 displays a drop-down menu. The user then selects Input from the drop-down menu in order to create a new engine case static structure model 20. The input GUI screen displays a box which enables the user to navigate file directories to input a flowpath file and a performance file. The user has the option to select filters which only display files with predefined file extensions. The product model software program 10 inputs the data from the flowpath and performance files and creates and displays a stick figure geometric representation 70 of a default flowpath 72. The user may accept and continue the operation of the product model software program 10 with the default flowpath 72 or the flowpath and performance files may be changed by selecting a new flowpath or performance file name from a list of flowpath files which are displayed on the input GUI screen 46.

A common method for selecting parameter inputs is selecting from default values offered to the user on the GUI screen. The default values are part of the engine case static structure knowledge base of parameters or specifications related to the engine case static structure model whose values are preprogrammed into the product model software program. Besides default values for parameters or specifications, the engine case static structure knowledge base may also contain constraints on parameter inputs. These constraints and default values may comprise either a single value or a range of values. For example, a parameter value may be greater than or less than a certain value. Also, the constraints and defaults may be derived from mathematical equations. A constraint or default value can either be dependent or independent of other parameters.

Referring to FIGS. 1 and 4, and in a step 302, the user selects the flowpath 72 and performance files, and, in a step 304, the product model software program 10 generates and displays a geometric representation of a default aerodynamic engine flowpath. The flowpath 72 includes a representation of components 52 such as compressors 92 and turbines 94.

Still referring to FIGS. 1 and 4, and a step 304, the user selects the Create button 62 from the engine case static structure main menu 86. From the Create drop-down menu, in a step 306, the user selects Stick Figure. In a step 308, the user selects the particular engine case static structure components 52 to create, or all components may be created. The components 52 can include a fan 100, a low pressure compressor 102, an intermediate case 104, a high pressure turbine 110, a low pressure turbine 106, and a turbine exhaust case 108. Depending on the components selected or the relationship of a component's parameters to the overall configuration, the product model software program 10, in a step 310, prompts for further parameters, such as whether a rotor of a high pressure turbine 110 is overhung or straddle mounted, or whether the rotor construction of a high pressure compressor 124 is drum or wing/flat/wing. In the case of the former, entering the high pressure turbine 110 mounting configuration determines the default locations 36 of bearings 112. Another prompted for configuration is a line of action start for the high pressure compressor 124 outer case 113.

Figure 2:
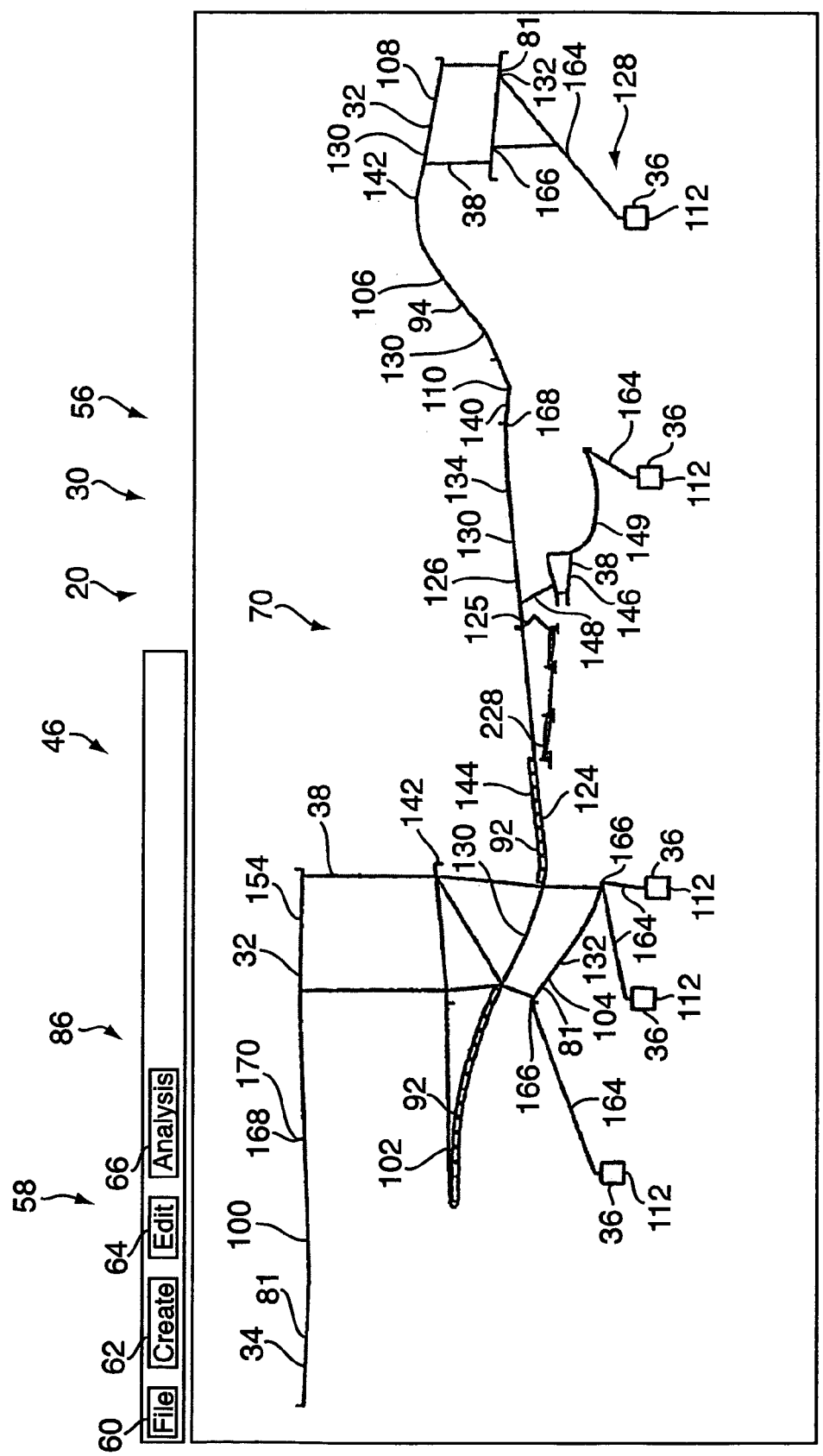
FIG. 2 is an illustration of the engine case static structure of FIG. 1 without the flowpath.

Referring to FIGS. 1, 2, and 4, and in a step 312, the product model software program 10 creates the default selected engine case assembly static structure model 20 to conform to the flowpath 72. The flowpath 72 is an annular area which defines a bypass air stream 118 and a core air stream 122. The geometric representation 70 of the engine case assembly static structure 30 is a simplified representation in stick figure format which shows enough detail to show the configuration and location of the frames 32, cases 34, and bearings 112. The stick FIG. 70 can be created rapidly because extensive calculations do not have to be performed, such as to determine wall thickness 80, as shown in FIG. 6B. The stick FIG. 70 represents the surface of the wall closest to the flowpath 72. The stick figure representation 70 of the engine case static structure 30 can also be shown without the flowpath 72. The user may create this view by selecting the Edit button 64 from the engine case static structure main menu 86 and selecting blank/unblank flowpath from the Edit drop-down menu. The product model software program 10 can also allow the user to zoom in a particular component 52 of the engine case static structure model 20.

Referring to FIGS. 1, 2, and 4, and in a step 314, the user may edit any of the individual components 52 shown in the stick figure representation 70 of the engine case static structure model 20. The user selects the Edit button 64 from the engine case static structure main menu 86, and from the Edit pull-down menu selects Edit the Stick Figure. Editing of individual components 52 enables the configuration parameters to be changed, components to be added or removed, and wall 81 locations to be adjusted. Due to the simplified stick figure geometry, changes may be made quickly without the need to perform intensive computations, and the changes can be quickly reflected on the GUI screens 46. The components 52 that may be edited include the fan 100, the high pressure compressor 124, a wishbone 125, a diffuser 126, the high pressure turbine 110, and a bearing assembly 128.

The type of the component 52 determines the parameters which may be edited. Editing enables the designer to review and modify the parameters used to configure the frame or case features. A case 34 primarily consists of an outer wall 130, while a frame 32 primarily consists of an outer wall 130, an inner wall 132, and struts 38. Struts 38 bridge the flowpath 72 and connect the inner wall 132 to the outer wall 130. Outer walls 130 may or may not be located outboard of rotating blades 138. Also shown are features representing the flowpath 72. A comparison of the diffuser 126 of FIG. 2 with FIG. 6 illustrates the flowpath features 72 versus the components 52 of the diffuser. The struts 38 of the frame 32 traverse the flowpath 72, enabling support loads to be transferred from the interior rotor support bearings 112 to the outer case walls 130.

Figure 5:
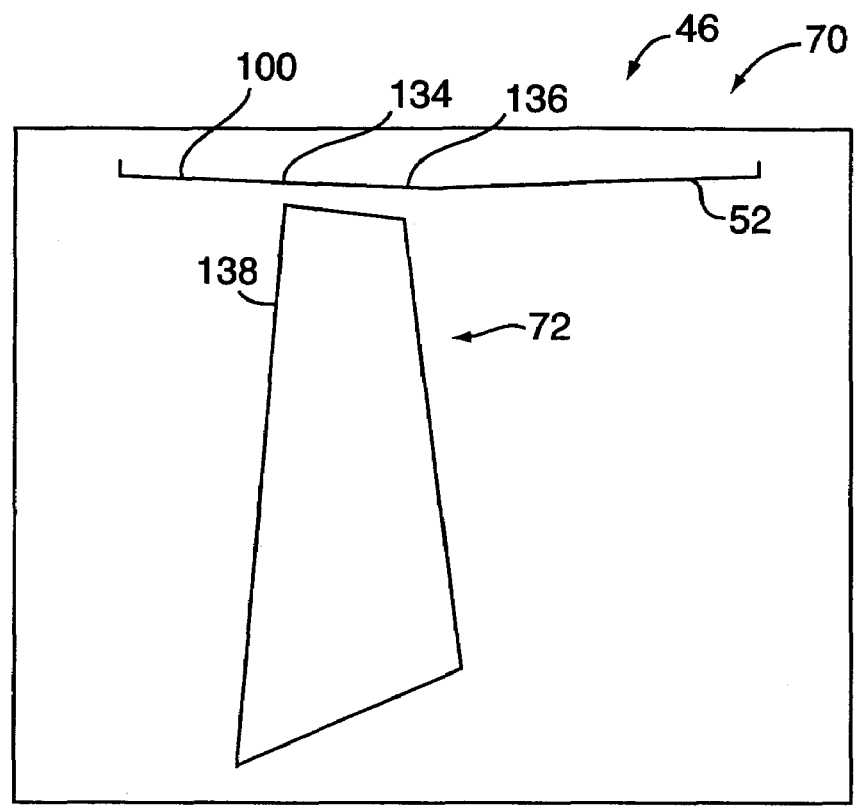
FIG. 5 is an illustration of a high pressure turbine case component of the engine case static structure model and flowpath created by the product model software program of FIG. 4.

Referring to FIGS. 4 and 5, and the step 314, the user selects the fan 100, which is a case 34, as opposed to a frame 32. The stick figure geometric representation 70 of the fan 100 displays the outer wall 130 and the fan blade 138. In a step 316, the user selects a module construction type parameter of either hard wall or Kevlar®, and also selects whether the wall 130 is split or full round. A construction type of split means that the wall 130 is split in half on an axial line while a construction type of full indicates that the wall is circumferentially unbroken. The split wall 130 enables easy access to the blades 138 for maintenance.

Continuing to refer to FIGS. 4 and 5, and in a step 318, the user modifies wall offsets, which is the distance of the wall 81 from the flowpath 72. The user, in a step 320, may add both midwall flanges and internal flange pairs. If the component is the high pressure compressor 124, the user can also add or edit an outer diameter bleed location 144. The outer diameter bleed 144 siphons air from a compressor 92 for use as a power source, such as powering air frame accessories or for cooling the turbine 94.

Default values for the parameters are generated from the previously entered configuration parameters. A common method for selecting numeric values (and for other types of parameter inputs, described hereinafter), is selecting from default values offered to the user on the GUI screen 46. The default values are part of the engine case static structure knowledge base 50 of parameters related to the engine case static structure model 20 whose values are preprogrammed into the product model software program 10. Besides default values for parameters or attributes, the engine case static structure knowledge base 50 may also contain constraints on parameter inputs. These constraints and default values may comprise either a single value or a range of values. For example, a parameter value may be greater than or less than a certain value. Also, the constraints and defaults may be derived from mathematical equations. A constraint or default value can be either dependent or independent of other parameters.

Throughout program execution, various GUI screens 46 such as the GUI screen 56 of FIG. 1, guides the user while entering data and information. These GUI screens 46 provide a visual display and graphic depictions of various model configurations and parameter data value selections to the user, allowing the user to select a desired default data value, or enter a desired data value. Many of the parameters of the engine case static structure model 20 may be modified both by manipulating the engine case static structure model with the mouse 42, and by changing the values of the parameters with the keyboard 40. The present invention contemplates that one of ordinary skill in the art will include someone with skill in designing a engine case static structure 30 for a gas turbine engine. Thus, the various attributes or parameters of the engine case static structure model 20, together with the values for these parameters, should be readily apparent to someone with such skill. Nevertheless, where appropriate, a discussion of various engine case static structure 30 parameters or attributes, together with the manner of deriving certain default or derived values for these parameters, is provided herein.

Referring to FIGS. 4 and 6, and in a step 324, the user may select a frame type component 32, such as the diffuser 126. The frame type component 32 has many of the same features of the case 34 including the module construction type, the type of construction, and adding or editing of the flanges 142, including, in a step 326, a mid-wall flange. A mid-wall flange is added to a wall 81 to strengthen the wall or provide a location for attaching other components 52. If the component 52 is the diffuser 126, the frame type component of the diffuser 126 includes an inner wall 132, a prediffuser inner wall 143, struts 38, a prediffuser outer wall 147, a cone wall 148, and a diffuser outer wall 134. The diffuser strut 146 bridges the flowpath 72 and connects the prediffuser inner wall 143 to the prediffuser outer wall 147. The cone wall 148 is a type of wall unique to the diffuser 126, the purpose of which is to connect the prediffuser outer wall 147 to the diffuser outer wall 134. In a step 328, if the user edits the outer diameter wall 134 configuration. The default diffuser outer wall 134 configuration is a straight line tangent to the flowpath 72 outer curve 136. The user can customize the diffuser outer wall 134 configuration so that a finite length of the outer wall coincides with the flowpath 72 outer curve 136.

Still referring to FIGS. 4 and 6 and the step 330, the user may modify the inner diameter wall 132 configuration of the diffuser 126. The diffuser's inner diameter wall 132 has a forward boundary set at a percentage of a diffuser strut's 38 inner diameter curve 145 length. The diffuser's inner diameter wall 132 has an aft boundary set at a percentage of the diffuser's inner diameter curve 149 length. In a step 332, the user modifies the diffuser cone wall 148 configuration by altering the cone angle 150. The location of the cone wall 148 intersection with the prediffuser outer wall 147 may also be modified.

Referring to FIGS. 4 and 6A, and in a step 334, the user may have the option to add one or more types of mounts 152 to a frame type component 32. The mount 152 is located on the frame type component 32 to attach the gas turbine engine to the air frame. Most frame type components 32, such as an inlet, a fan exit 154, and the turbine exhaust 108, can optionally have at least one mount 152 attached. In a step 336, the user selects the type of mount 152 to add or edit. A geometric representation of the selected mount 152 in stick figure format is displayed on a GUI screen 46.

Continuing to refer to FIGS. 4 and 6A, and in a step 338, one type of mount 152 which may be added to a frame type component 32 is a thrust mount 156, which transfers the forces from the thrust of the gas turbine engine to the air frame. In a step 340, the three-dimensional coordinates of the thrust mount 156 and, in a step 342, thrust mount components, such as attaching strut angle inputs, may be edited by the user. In a step 344, the configuration parameters for a thrust mount 156 clevis, which is a U-shaped metal piece with holes in each end through which a pin or bolt is run, is edited. In a step 346, the thrust mount 156 includes a mount link whose configuration parameters are edited by the user. For both the clevis and the mount link, configuration parameters which may be edited include the type of material selected for the clevis and mount link, as well as the height and thickness of the clevis and the cross-section area of the mount link. The operational temperature of the clevis may also be edited, and similarly the operational temperature for the mount link material may be edited.

Still referring to FIGS. 4 and 6A, in a step 348, another type of mount 152 is a clevis mount 158 for transferring vertical and horizontal forces from the gas turbine engine to the air frame. In a step 350, the configuration of clevis mount components may be edited. In a step 352, an outer case monoball mount 160 for transferring vertical and horizontal forces from the engine to the air frame may be added to the engine case static structure model 20. In a step 354, outer case monoball mount components may be edited. In a step 356, the user may select and add a torque mount 162 to transfer torque caused by rotation of the rotors within the gas turbine engine to the air frame. In a step 358, the torque mount components may be edited. The engine case static structure model 20 has at least one of the mounts 152 and could have at least one of all four types of mounts 156, 158, 160, 162.

Referring to FIGS. 1, 2 and 4, and in a step 360, the locations 36 of the bearings 112 and bearing supports 164 from the bearings to the frames 32 are displayed in the representation 70 of the engine case static structure model 20. The bearings 112 may be moved either with the mouse 42 or by entering new coordinates with the keyboard 40 on the GUI screen 46. The user may select a style of bearing 112, such as ball, roller or tapered roller. Ball and tapered roller bearings 112 position the rotors axially and radially. Roller bearings 112 position the rotors radially and allow for axial thermal growth of the rotors.

Still referring to FIGS. 1, 2 and 4, and in a step 362, the user may add, edit, and delete the bearing supports 164. The bearing supports 164 transmit the support load from the bearing 112 to the inner wall 132 of the frame 32. The location of the bearing support 164 on the inner wall 132 can be modified from its default location. The mouse 42 may be used to select and drag the inner wall end 166 of the bearing support 164 to another location on the inner wall 132, thereby moving the bearing support itself.

Continuing to refer to FIGS. 1, 2, and 4, in a step 364, the frame 32 and case 34 wall 81 boundary locations 168 between segments of a wall 81 and between components 52 may be moved by selecting the wall boundary location with the mouse 42 and then dragging the wall boundary to a new location. The wall boundaries 168 typically represent a flange interface 170. The product model software program 10 determines default locations for the wall boundaries 168 based on the rules in the engine case static structure knowledge base 50, the default flowpath 72 and the performance parameters. The user may modify the default wall boundary locations. The location of a wall boundary 168 may also be moved by entering a new coordinate with the keyboard 40 for the wall boundary 168. The wall boundary 168 may be located either exactly at the coordinates entered, at the location as set by the mouse 42, or on the location nearest the flowpath 72 corresponding to the axial location of the coordinates entered or set by the mouse.

A gas turbine engine must operate under a number of different conditions, including takeoff, a maximum climb, and landing conditions and cruising conditions. All of these operating conditions generate different flight point performance requirement parameters that the engine case static structure model 20 must be able to meet. Referring to FIG. 4, and in a step 366, the user has the option to modify the flight performance parameters point data which are provided by the flowpath designer. Flight points parameters represent discreet operating conditions at several locations within the gas turbine engine and include temperature, pressure and mass flow. The user selects the particular flight point or operating conditions and then modifies the flight point parameters. The flight point parameter data is used by the product model software program 10 to calculate the configuration of the engine case static structure 30 components 52.

The performance data is generated by thermodynamic analysis. Specifications parameters for a flight point include altitude, the mach number, the ambient temperature, the ambient pressure, a bypass pressure ratio, a low rotor revolutions per minute specification, the torque, a high rotor revolutions per minute specification, and a high torque specification. Parameter specifications at numerous locations throughout the gas turbine engine include a pressure, a temperature, and a mass flow. The previously mentioned parameters may be modified by the user to generate different sizing conditions for the frames 32, the cases 34 and other components 52.

Referring to FIGS. 4 and 6B, and in a step 368, once the flowpath 72 and performance parameters have been entered and modified to the satisfaction of the user, the user can generate a two-dimensional geometric representation 169 of the engine case static structure 30. Referring to FIG. 1, the user selects the Create button 62 from the main menu 86 and selects Geometry from the Create pull-down menu. Referring to FIG. 6B, the two-dimensional representation 169 of the selected components 52 of the engine case static structure 30 is displayed on a GUI screen by the product model software program 10. The two-dimensional representation 169 of selected components 52 may be displayed with or without a representation of the flowpath 72, or the stick figure representation 70. The generation of two-dimensional geometry performs the calculations to add wall thickness 80 to the stick figure representations 70 of the engine case static structure components 52.

Figure 7:
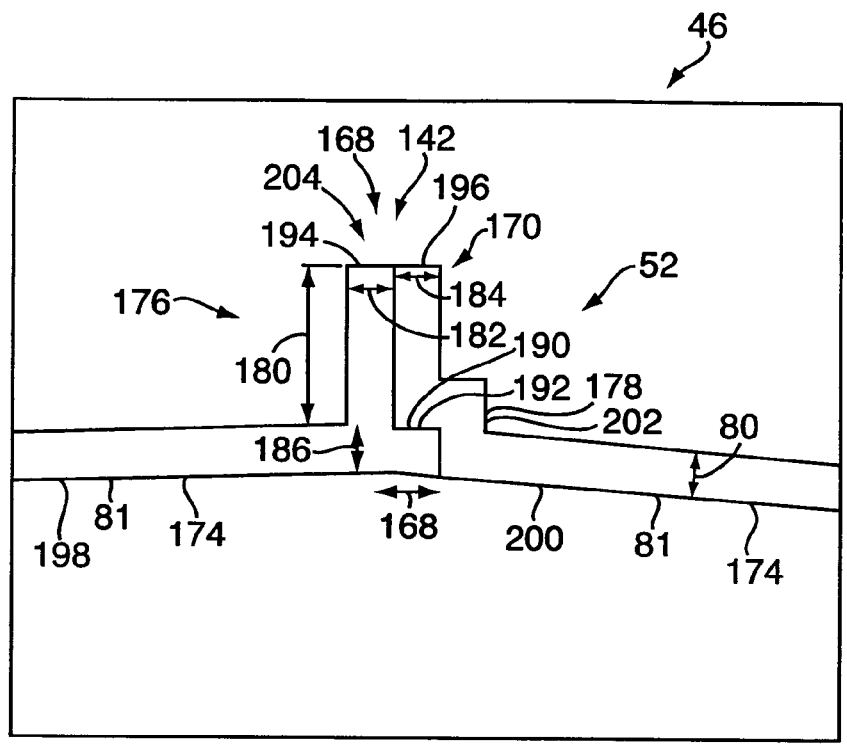
FIG. 7 is an illustration of a flange component of the engine case static structure model created by the product model software program of FIG. 4.

Referring to FIGS. 4 and 7, and in a step 370, after creating the two-dimensional geometric representation 169 of the engine case static structure 30, the user can edit the parameters of the flange interfaces 170. The user selects the flange 142 from the two-dimensional geometric representation 169 of the engine case static structure model 20 using the mouse 42. The user may select either flange pairs 142 or midwall flanges (not shown), which are used for stiffening or possibly for attaching other components. Flange pairs 142 are located at the edges of segments 174 of walls 81.

Still referring to FIGS. 4 and 7, the user in a step 372, selects a flange type 176 from a list including no radial snap, an outer diameter snap facing the right side, an outer diameter snap facing the left side, an inner diameter snap facing the right side 178, an inner diameter snap facing the left side, or no flange. Once the flange type 176 has been selected, in a step 374, configuration parameters related to the flange 142 may be edited by the user. Depending on the type of flange 142 selected, the configuration parameters may include a flange height 180, a flange thickness of the left side 182, a flange thickness on the right side 184, a snap thickness 186 and a snap length 188. A snap 190 is the circumferential contact area 192 between a left side of the flange 194 and a right side of the flange 196. The snap 190 provides radial interference at the circumferential contact area 192 of the flange pair 142 to provide stability which reduces unwanted radial motion at the flange interface. The radial interference is created by making the inner diameter of the snap surface of the flange 196 slightly smaller than the outer diameter of the snap surface of the flange 204. The flange pair 142 is secured together axially with a series of bolts (not shown).

Referring to FIGS. 4 and 6B, and in a step 376, the user edits configuration parameters for individual components 52 by selecting the Edit button 64 from the engine case static structure main menu 86. The user selects from a list of frames 32 or cases 34 including the fan 100, the low pressure compressor 102, the high pressure compressor 124, or the diffuser 126. Once the component 52 has been selected, further sub-components may be selected, including walls 81, walls outboard of rotating blades 130, or struts 38 connecting the inner walls 132 and outer walls 130 of frame type components 32. In a step 378, the wall material parameters may be edited including the material name, the material type, and a temperature for interpolation of temperature dependent material properties. Wall material property parameters can also be edited.

Still referring to FIGS. 4 and 6B, and in a step 380, the user edits wall thickness parameters. The thickness of the wall 81 varies as a function of the wall radius. Additional parameters for calculating the wall thickness include a manufacturing wall thickness, and optionally, a pressure generated wall thickness and a blade containment generated wall thickness. Blade containment sizing is an option only for walls 130 outboard of blades 138. In a step 382, the user edits the manufacturing wall thickness parameter, which is the minimum wall thickness producible by best practice manufacturing experience. This parameter is based upon the type of material selected and the design rules stored in the engine cases static structure knowledge base 50.

Continuing with FIGS. 4 and 6B, and in a step 384, the user edits the pressure generated wall thickness parameters. Pressure sizing uses the pressure data from the performance file flight point data, radii of the wall contour, pressure factor or safety factor, and allowable stress to determine wall thickness at forty locations along the wall. The pressure generated wall thickness parameters include the option to size the wall for pressure, the wall pressure differential, and a selection from a list of pressure factors. The user may also edit the allowable stress, which is the ultimate strength divided by a pressure factor. The ultimate strength parameter is one of the material parameters stored in the engine cases static structure knowledge base 50. Another pressure generated wall thickness parameter is the wall thickness tolerance, which is obtained from manufacturing data stored in the engine cases static structure knowledge base 50.

Still referring to FIGS. 4 and 6B, and in a step 386, the user edits blade containment generated wall thickness parameters. A wall 81 is sized for containment when the wall 130 is outboard of a blade 138, for instance, being outboard of the fan 100 or the high pressure compressor 124. The wall containment sizing is designed to prevent the blade 138 from penetrating the wall 130 and affecting the air frame if the blade breaks free from its attachment.

Continuing to refer to FIGS. 4 and 6B, containment generated wall thickness parameters include whether to size the wall for buckling, and the radius of the wall, which can vary over the extent of the wall. Containment parameters also include dynamic sheer strength, a sheer factor, a dynamic factor, a material factor, and a containment factor. The containment parameters include an identifier of blades which may need to be contained. Containment sizing parameters also include whether to size the wall for shear and whether to size the wall for hoop. An algorithm calculates the size of the wall 130 needed to contain the blade 138 that separates from its attachment. If a rotating blade 138 is not associated with the wall 81, the containment sizing parameters are not displayed to the user.

Continuing to refer to FIGS. 4 and 6B, and in a step 388, after all manufacturing parameters, pressure parameters, containment parameters, and material parameters have been chosen, the wall thickness may be calculated. The wall thickness is the maximum of the calculated wall thickness for either the manufacturing parameters, the pressure wall parameters, or the containment wall parameters.

Figure 8:
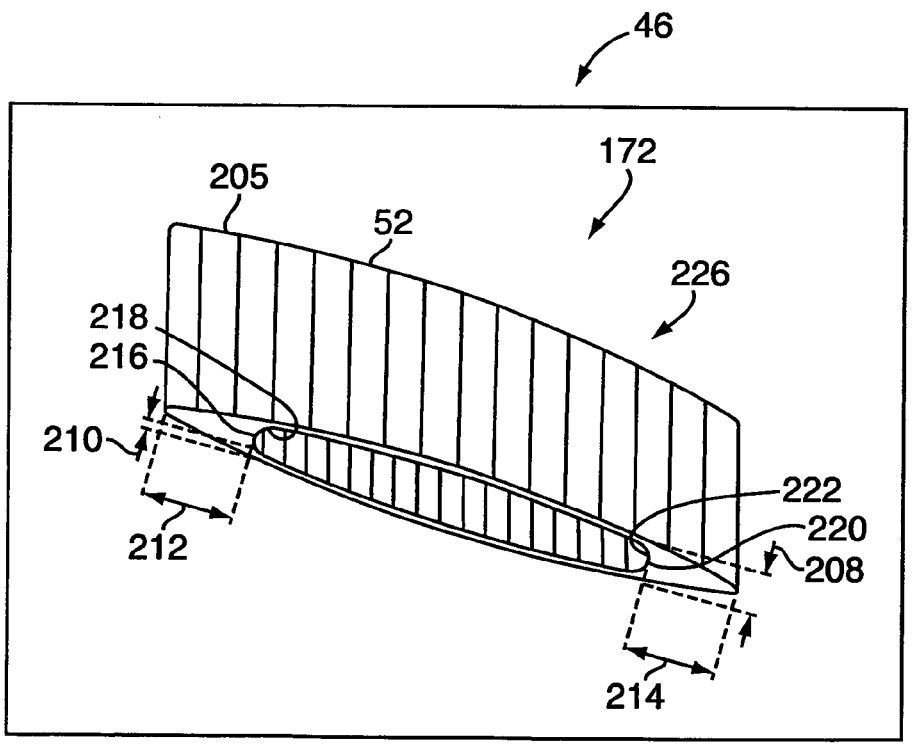
FIG. 8 is illustration of a strut component of the engine case static structure model created by the product model software program of FIG. 4.

Referring to FIGS. 4 and 8, for the frame type components 32, the inner wall 132 and outer wall 130 are edited as described above. In addition, in a step 390, the user may edit the parameters relating to the struts 38 that connect the inner wall 132 and outer wall 130. For a selected frame component 32, in a step 392, the user edits strut parameters which include the total number of struts 38 and the rotation angle of the struts. In a step 394, the product model software program 10 calculates the flowpath blockage percentage caused by the struts 38. A frame component 32 may include two types of the struts 38: thin struts 206 and thick struts. Each frame component 32 includes at most one thick strut, which contains a shaft for a gas turbine engine gearbox inside the thick strut. The strut parameters include the number of thin struts 206, and the strut thickness for the thin strut and the thick strut.

Still referring to FIGS. 4 and 8, and in a step 396, the user edits strut property parameters for the thin struts 206 as well as for the thick strut. The strut property parameters include a name and a type of material from which the strut is formed and a material property interpolation temperature. Strut material property parameters may also be edited by the user.

Continuing to refer to FIGS. 4 and 8, and in a step 398, the user edits strut configuration parameters which include a strut thickness 208 and a strut construction type which is either solid or hollow. Strut configuration parameters also include a strut wall thickness 210, a leading edge thickness 212 of the strut 38, a trailing edge thickness 214 of the strut, a leading edge radius, a trailing edge radius, a filet 216 along a leading edge inner surface 218 of the strut, and a filet 220 along a trailing edge inner surface 222 of the strut. The weight of the strut 38 may now be calculated. The user also can select the layout display of the strut 38, including from the left, the top or the rear. The strut display may be two-dimensional or three-dimensional.

Referring to FIGS. 4 and 9, the product model software program 10 implemented with the ICAD system allows the user to perform various types of engineering analyses on the engine case static structure model 20 to assess various performance features of the model. A weight report 54 may be generated for the engine case static structure model 20 and upon various components 52 of the engine case static structure model. The user can assess the weight of the design chosen for the selected engine case static structure component 52 or for the entire engine case static structure model 20. The weight calculations are based upon the default and edited engine case static structure parameters, the engine case static structure geometry previously entered into the product model software program 10, and the engine case static structure component material, entered in the weight analysis report 54.

Figure 10:
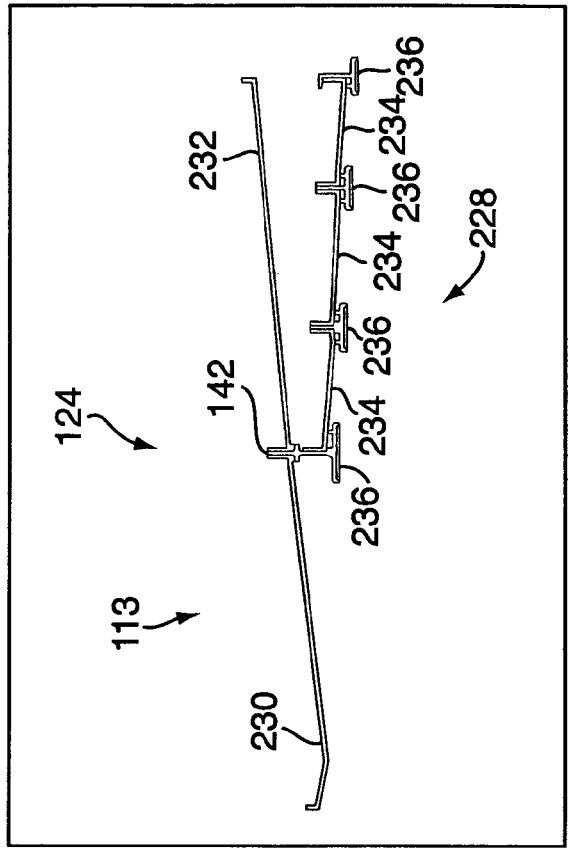
FIG. 10 is an exemplary graphical user interface of the product model software program of FIG. 4 illustrating sub-components of the weight analysis report of FIG. 9.
Figure 11:
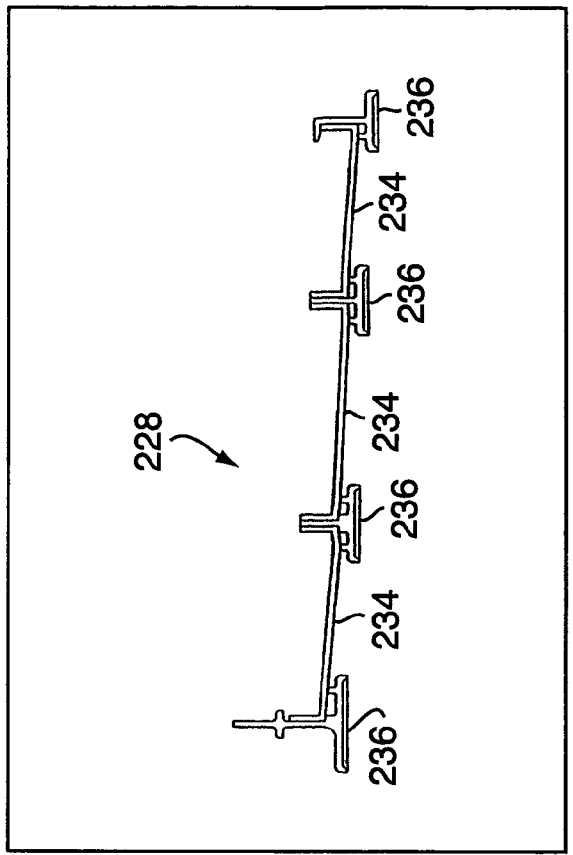
FIG. 11 is an exemplary graphical user interface of the product model software program of FIG. 4 illustrating sub-components of the weight analysis report of FIG. 10.

Continuing with FIGS. 4 and 9, and in a step 400, the user selects the Analysis button 66 from the engine case static structure main menu 86 and chooses the weight report 54 from the drop-down menu. The weight for each component 52 is generated, and in a step 402, displayed for each component of the engine case static structure 30 as well as for the total engine case static structure. The weight analysis report 54 is displayed hierarchically. Each component 52 may be selected to display the weight of the sub-components 224 which compose the component. For example, referring to FIGS. 6B and 10, the sub-components 224 of the high pressure compressor 124 may include a ring case assembly 228, a segment one 230, and a segment two 232. Referring to FIGS. 6B and 11, the sub-components 224 may also be selected to display the components 226 composing the sub-components. For example the high pressure compressor's 124 ring case assembly 228 may include spacer cases 234 and outer air seals 236.

Referring to FIG. 4, the default geometric representation displayed by the product model software program 10 is a two-dimensional representation 169. Referring to FIGS. 4 and 8, some components, such as the frame type components 32, may be displayed in three-dimensional geometric representation 172. In a step 404, the user selects the type of geometric representation by selecting the Edit button 64 on the engine case static structure main menu 86, and from the displayed pull-down menu, selecting blank/unblank three-dimensional assemblies.

Referring to FIG. 4, in a step 406, the engine case static structure model 20 is further analyzed by selecting the File button 60 on the engine case static structure main menu 86, selecting Output from the pull-down menu, selecting ARDA (Advanced Rotor Dynamic Analysis) from the Output selections. The ARDA selection of the product model software program 10 creates a model used by the ARDA program for computing the effects of rotor dynamics upon the engine case static structure, such as vibration and deflection. The user may select the components 52 to be analyzed, as well as which segments of a component are to analyzed. After the user has finished selecting components 52, an ARDA output file is created for input to the ARDA program. The results of the ARDA analysis may be used by the user to modify the design of any of the components 52 of engine case static structure model 20.

Continuing with FIG. 4, and in a step 408, further analysis is performed on the engine case static structure model 20 by selecting from the File button 60 on the engine case static structure main menu 86 the pull-down menu selection of Output, and from the Output selection, NASTRAN. The NASTRAN selection of the product model software program 10 creates a three-dimensional finite element model used by the NASTRAN program for backbone bending analysis. The NASTRAN finite element model mesh is displayed on the GUI screen. The parameters of the NAS- TRAN finite element model may be modified by the user. This includes the number of circumferential mesh elements and the number of axial mesh elements for each component. After the user has finished editing the default finite element parameters, the finite element model may then be output to a file and then used as input to the NASTRAN program.

Still referring to step 408, the product model software program 10 creates a customized course mesh for analysis by the NASTRAN program. After the user inputs boundary conditions including loads and constraints the NASTRAN finite element model analysis program computes deflections which could occur to the engine case static structure 30 when a load is applied to the gas turbine engine such as from thrust, torque or maneuvers. The deflection of the engine case static structure 30 can have an adverse effect on rotor blade tip outer air seals which have very small clearances defined between the tips of the blades and the outer air seal. The stiffness of the case may be increased by increasing the case's thickness or configuration. However, wall thickness increases the weight of the case and frame. The results of the NASTRAN analysis may be used by the user to modify the design of any of the components 52 of engine case static structure model 20.

Continuing with FIG. 4, and in a step 410, the product model software program 10 allows the user to modify any portion of the geometry of engine case static structure model 20. This can be done any time after engine case static structure model 20 has been created by product model software program 10 implemented with the ICAD system. If the user is not satisfied with the results of the weight analysis report 54 or any of the other features of the engine case static structure model 20, the user can return to any step in the design process, such as the step 314, to modify the engine case static structure model. The geometric representation 70 of the resulting engine case static structure model 20 may be generated and displayed at any time and further modified, if desired.

Continuing with FIG. 4, once the user is satisfied with the resulting engine case static structure model 20, the user may create a parametric CAD model of the engine case static structure model 20 by generating a parametric interface input file. In a step 412, the user selects the File button 60 from the engine case static structure main menu 86, selects Output from the File pull-down menu, and selects Parametric Geometry. The user then selects the components 52, such as the intermediate case 104 or the diffuser 126, of the engine case static structure to output. The product model software program 10 then commands the ICAD system to calculate the specification parameters for the selected geometric components 52 of the engine case static structure model 20. The specification parameters are calculated from user entered configuration and parameter data, and from the stored default values and rules relating to various physical limits and constraints placed on the data values.

The parametric interface input files that are created and written by the ICAD system may then be input into an interface computer program. These ICAD system files contain a listing of the engine case static structure model 20 data including geometric configurations, specifications and parameters, together with the corresponding Boolean operations (i.e., the engine case static structure model update commands of "Unite", "Subtract", and "Intersect"). These operations integrate the data into the engine case static structure model 20 that will reside in the CAD system, such as Unigraphics. The files are output by the product model software program 10.

The interface computer program essentially functions as an interface and translator between the ICAD system and the CAD system, such as Unigraphics. Both the interface program and the product model software program 10 implemented with the CAD system may be installed and executed within the same work station 44 as that of the ICAD system. Specifically, the interface program uses the ICAD system engine case static structure model 20 geometric data and commands, which were output as files, to generate, or recreate a similar parametric model of the engine case static structure that is used within the CAD system. This is done to overcome the inherent shortcomings (i.e., the incompatibilities between the ICAD system and the CAD system) of each system discussed above in the "Background Art" section.

Still referring to FIG. 4, and in a step 414, the user creates non-parametric CAD input files for selected sections of the engine case static structure model 20. The user selects specific geometric representations of the engine case static structure model 20 to output, such as all two-dimensional or three-dimensional model components 52, or only a particular component, such as the diffuser 126 or the intermediate case 104. The non-parametric model created in the CAD system may not be easily altered, and so it is of limited use. However, drawings based on the model are useful, along with other functions of the CAD system which are not provided by the ICAD system, such as combining the geometric representations of the engine case static structure 30 with other gas turbine engine components 52.

Although the present invention has been shown and described with respect to the detailed embodiments thereof, it will be understood by those skilled in the art that various changes in the form and detail thereof, such as implementing the present invention with other software besides the aforementioned expert system, may be made without departing from the claimed invention.

What is claimed is:

1. A computer implemented method of designing an engine case static structure of a gas turbine engine, comprising the steps of:
   creating signals representing an engine case static structure knowledge base of information having a plurality of design rule signals with respect to a corresponding plurality of parameter signals of associated elements of an engine case static structure, wherein the engine case static structure knowledge base comprises a data value signal for each one of the plurality of design rule signals;
   entering a desired data value signal for a selected one of the plurality of parameter signals of an associated element of the engine case static structure;
   comparing the entered desired data value signal for the selected one of the plurality of parameter signals with the corresponding data value signal in the engine case static structure knowledge base for the corresponding one of the plurality of design rule signals; and
   creating signals representative of a geometric representation of the selected one of the plurality of parameter signals of the associated element of the engine case static structure if the result of the step of comparing is such that the entered desired data value signal for the selected one of the plurality of parameter signals is determined to have a first predetermined relationship with respect to the corresponding data value signal in the engine case static structure knowledge base for the selected one of the plurality of design rule signals.

2. The method of claim 1, wherein the step of creating the signals representative of a geometric representation of the selected one of the plurality of parameter signals of the associated element of the engine case static structure further comprises the step of updating signals representing a model of the engine case static structure with the selected one of the plurality of parameter signals of the associated element of the engine case static structure.

3. The method of claim 1, further comprising the step of modifying the entered desired data value signal for the selected one of the plurality of parameter signals if the result of the step of comparing is such that the entered desired data value signal for the selected one of the plurality of parameter signals is determined to have a second predetermined relationship with respect to the corresponding at least one data value signal in the engine case static structure knowledge base for the selected one of the plurality of design rule signals.

4. The method of claim 3, further comprising the steps of:
comparing the modified data value signal for the selected one of the plurality of parameter signals with the corresponding data value signal in the engine case static structure knowledge base for the corresponding one of the plurality of design rule signals; and
creating signals representative of a second geometric representation of the selected one of the plurality of parameter signals of the associated element of the engine case static structure if the result of the step of comparing is such that the modified data value signal for the selected one of the plurality of parameter signals is determined to be of the first predetermined relationship with respect to the corresponding data value signal in the engine case static structure knowledge base for the corresponding one of the plurality of design rule signals.

5. The method of claim 1, further comprising the step of storing the signals representative of the created engine case static structure knowledge base of information.

6. The method of claim 1, further comprising the step of displaying the signals representative of the created geometric representation of the selected one of the plurality of parameter signals of the associated element of the engine case static structure.

7. The method of claim 1, further comprising the step of generating wall thickness parameter signals includes manufacturing wall parameter signals, pressure generated parameter signals, containment generated parameter signals, and wall radius parameter signals.

8. The method of claim 1, further comprising the step of generating strut configuration parameter signals includes flow blockage parameter signals, strut material properties parameter signals, and strut dimension parameter signals.

9. The method of claim 1, further including the steps of:
receiving signals representing flowpath parameters for entering aerodynamic performance requirement parameter signals;
receiving signals representing performance parameters for entering engine case static structure thermodynamic performance requirement signals; and
creating a default geometric representation of the engine case static structure utilizing the flowpath parameter signals, the performance parameter signals, and the design rule signals.

10. The method of claim 1, further comprising the step of analyzing the signals representative of the geometric representation of the selected one of the plurality of parameter signals of the associated element of the engine case static structure.

11. The method of claim 10, wherein the step of analyzing the signals representative of the geometric representation of the selected one of the plurality of parameter signals of the associated element of the engine case static structure further comprises the step of performing a weight analysis on the signals representative of the geometric representation of the selected one of the plurality of parameter signals of the associated element of the engine case static structure.

12. The method of claim 1, wherein the step of creating the signals representative of the geometric representation of the selected one of the plurality of parameter signals of the associated element of the engine case static structure further comprises the step of creating signals representative of a model of the engine case static structure.

13. The method of claim 1, wherein the data value signal for each one of the plurality of design rule signals in the knowledge base comprises a numerical value.

14. The method of claim 1, wherein the data value signal for each one of the plurality of design rule signals in the knowledge base comprises a range of values.

15. The method of claim 1, wherein the step of entering a desired data value signal for a selected one of the plurality of parameter signals of an associated element of the engine case static structure further comprises the steps of:
presenting a data value signal for each one of the plurality of parameter signals of the associated element of the engine case static structure; and
selecting a desired data value signal for the selected one of the plurality of parameter signals of the associated element of the engine case static structure from the presented data value signal for each one of the plurality of parameter signals of the associated element of the engine case static structure.

16. The method of claim 15, wherein the step of presenting a data value signal for each one of the plurality of parameter signals of the associated element of the engine case static structure further comprises the step of providing a visual display containing signals representative of a graphic depiction of the data value signal for each one of the plurality of parameter signals of the associated element of the engine case static structure.

17. A computer implemented method of designing an engine case static structure for a gas turbine engine, comprising the steps of:
providing an engine case static structure knowledge base storing a plurality of engine case static structure design parameter signals corresponding to a plurality of design rule signals, wherein the engine case static structure knowledge base includes a design parameter signal for each of the design rule signals;
receiving a parameter value signal corresponding to the design parameter signal;
comparing the parameter value signal with the design parameter signal stored in the engine case static structure knowledge base;
modifying the value of the design parameter signal if the parameter value signal has a first predetermined relationship with the design parameter signal and the design rule signal;
creating a geometric representation of the engine case static structure by utilizing the design parameter signals; and
displaying the geometric representation of the engine case static structure.

18. The method of claim 17, wherein the step of receiving a parameter value signal includes the step of employing a mouse to provide the value of the parameter value signal.

19. The method of claim 18, wherein the step of employing the mouse includes altering a geometric representation of the engine case static structure.

20. A computerized system for designing an engine case static structure of a gas turbine engine, comprising:
   an engine case static structure knowledge base for storing a plurality of engine case static structure design parameter signals corresponding to a plurality of design rule signals for creating a geometric representation of an engine case static structure;
   selection means for receiving a parameter value signal corresponding to the design parameter signals;
   processing means for comparing the parameter value signal with the design parameter signals stored in the engine case static structure knowledge base; and
   means for creating the geometric representation of the engine case static structure if the parameter value signal has a first predetermined relationship with the design parameter signal and the design rule signals.

21. A computerized system for designing an engine case static structure of a gas turbine engine, comprising:
   an engine case static structure knowledge base including a plurality of design rule signals for generating signals representing an engine case static structure model, wherein each of the design rule signals has a first relationship with a design parameter signal;
   input means for receiving a design parameter value signal corresponding to the design parameter signal;
   evaluation means for comparing the design parameter value signal with the plurality of design rule signals;
   adjustment means for modifying the engine case static structure model signals utilizing the design parameter value signal and the plurality of design rule signals; and
   creation means for generating signals representative of a geometric representation of the engine case static structure model signals.

22. The computerized system of claim 21, wherein the design parameter signals include flowpath parameter signals received from the input means and performance parameter signals received from the input means.

23. The computerized system of claim 22, further including means, utilizing the design rule signals, for creating engine case static structure model configuration signals utilizing the flowpath parameter signals, the performance parameter signals, and the plurality of design rule signals.

24. The computerized system of claim 21, further including:
   cautionary means for generating a warning signal if the design parameter value signal does not satisfy the plurality of the design rule signals; and
   means for displaying the warning signal.

25. The computerized system of claim 21, further including:
   material parameter signals received from the input means;
   means for generating weight signals for the engine case static structure model utilizing material parameter signals and engine case static structure model signals.

26. The computerized system of claim 21, wherein the design parameter signals include performance parameter signals for generating analysis signals of the engine case static structure model, and manufacturing parameter signals for establishing manufacturing constraints and preferences for the engine case static structure model.

* * * * *